Aug. 8, 1961        L. A. BENNETT        2,995,254
WATER FILTER
Filed April 2, 1958
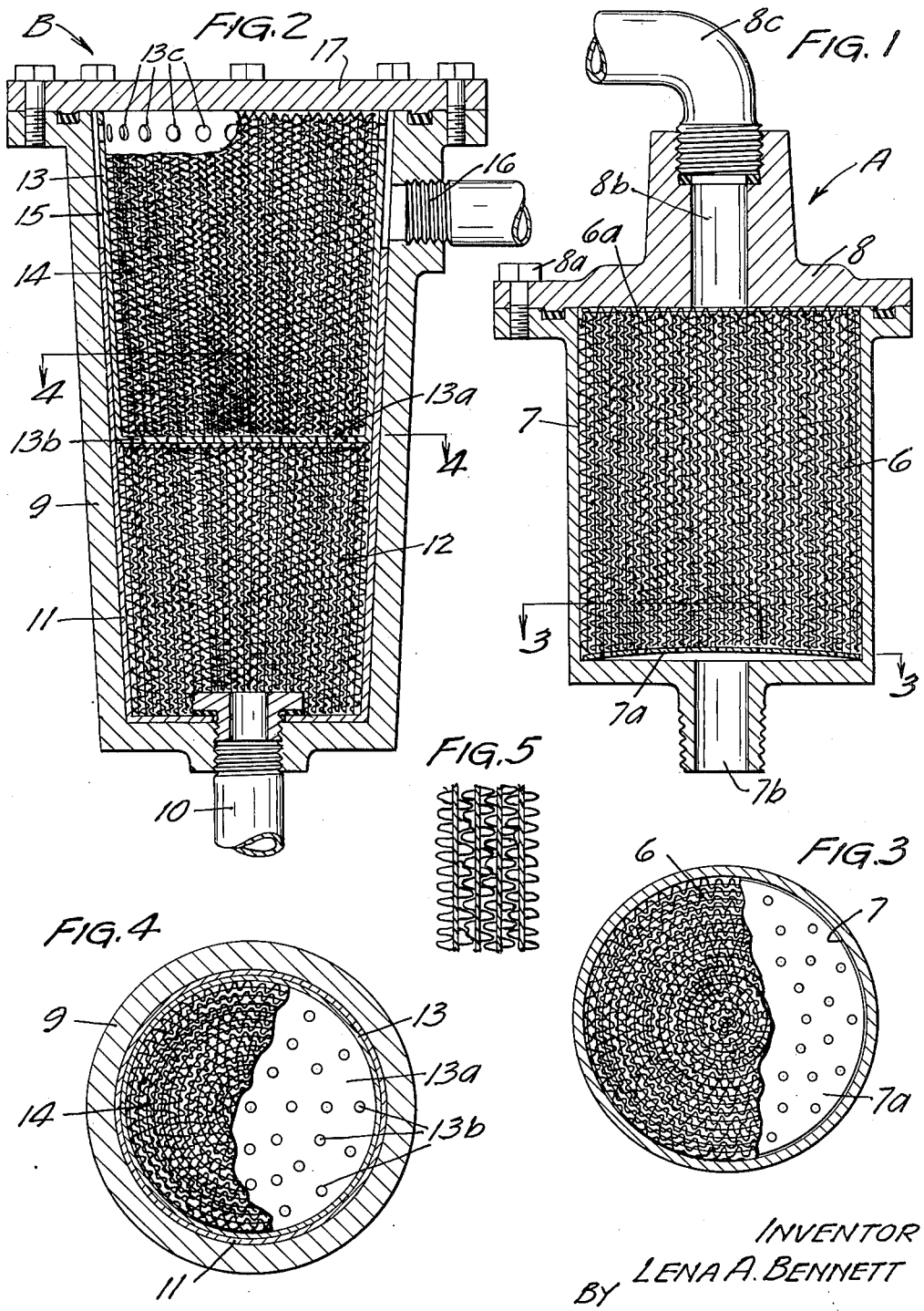
INVENTOR
LENA A. BENNETT
BY
Williamson, Schroeder, Adams & Palmatier
ATTORNEYS 2,995,254
WATER FILTER
Lena A. Bennett, 217 W. 36th St., Minneapolis, Minn.
Filed Apr. 2, 1958, Ser. No. 725,871
2 Claims. (Cl. 210—337)

This invention relates to filters for liquids and particularly to a filter for removing rust particles from water.

For many years water, containing rust particles, has been a problem for the housewife. It is frequently difficult to remove iron particles from the water and even when removed at one place in the system additional particles will develop upon oxidation of water containing a relatively high iron content.

It is an object of my present invention to provide a water filter which is designed for relatively inexpensive manufacture and which in one form thereof is particularly adapted for attachment at the supply faucet, such as in household laundries and the like, for removal of particles from the water being supplied for washing of clothes, said filter being constructed to permit quick and easy changing of the filtering material.

It is another object to provide a filter for water which includes a double section filter bed of unique design wherein either or both of said beds may be quickly and easily replaced at an inexpensive cost and wherein said beds are provided with a seal around the edges thereof and between the edges of the adjacent portions of the shells surrounding the same whereby the water is caused to flow through substantially the entire area of the bed material in both segments thereof.

It is a specific object of this invention to provide a filter for flowing water which includes as the filtering element thereof an elongated cloth having loop filaments on the surface thereof to extend out into the flow of water as it passes through the rolled filter element to remove the solid particles from the flowing water.

These and other objects and advantages of my invention will more fully appear in the following description made in connection with the accompanying drawings wherein like reference characters refer to the same or similar parts throughout the several views, and in which:

FIG. 1 is a vertical sectional view through one form of my filter unit and showing the same attached to a water faucet;

FIG. 2 is a vertical sectional view through an alternative form of the invention;

FIG. 3 is a horizontal sectional view taken substantially along the line 3—3 of FIGURE 1;

FIG. 4 is a horizontal sectional view taken substantially along line 4—4 of FIGURE 2; and, FIG. 5 is an enlarged fragmentary detail view of the looped filter cloth material.

As illustrated in the accompanying drawings, I provide a liquid filter particularly designed for the removal of solid particles carried by a water supply. Form A of my invention is illustrated in FIGS. 1 and 3 wherein a single filter element is provided such as the rolled, looped cloth material such as terry cloth or toweling material designated as an entity by the numeral 6. This cloth material has absorbent loops formed on the surface on both sides thereof and is initially folded longitudinally into plurality of thicknesses and is subsequently rolled into a plurality of convolutions with the folded edges disposed at the top inlet end thereof. As indicated at 6a, the outer layer of the outermost convolution is folded up and over the top of the entire filter element as illustrated and serves to distribute the flow into the upstanding rolls or convolutions and tends to prevent the flow from travelling through the areas between said convolutions. The rolled cloth material is of such a size as to be snugly received within a hollow filter casing 7 defining a filter chamber therewithin. A perforated upwardly convex spacing partition or reinforcing member 7a is mounted in the bottom of the hollow filter body 7 and is sufficiently stiff to hold the filter bed in upwardly spaced relation from the discharge opening 7b in the bottom of the filter to thereby define a dome-shaped chamber so that all parts of the cross sectional area can deliver to said opening. A removable cover 8 permits easy removal of the filter unit in order to clean or replace the same. The cover is held in place by any suitable means such as the cap screws 8a and said cover is provided with a supply passage 8b, having internal threads at the top thereof to receive the threads of a water supply faucet 8c. A suitable gasket may be provided to insure a positive seal between the removal cover 8 and the top of the filter casing 7. The outwardly extending loops of the cloth forming the filter element edge provides a flow restricting and absorbent filament which produces a composite filter unit of extremely great area of contact with the flowing water which will remove the particles therefrom with a minimum of head loss therein. These tiny filtering filaments are disposed on both sides of the cloth and are relatively close together to produce a highly efficient filtering action.

Form B of my invention is illustrated in FIGS. 2 and 4 wherein a pair of filter elements are arranged in end to end relation within a casing 9 having an inlet 10 at the bottom thereof. A bottom shell 11 lines the inside of the casing and a lower filter element 12, of the type described in form A, is mounted in the bottom of the shell 11. A removable casing, or shell 13, is nested within the upper portion of the liner 11 and both elements are slightly tapered in order to provide a positive seal between engaged portions thereof. The bottom 13a of the shell 13 has a plurality of perforations 13b formed therethrough to permit the flow of liquid to pass upwardly into the chamber defined by said shell 13. A second filter element 14 of rolled, folded filtering cloth, similar to the filtering elements 6 and 12, is packed into the upper chamber defined within the shell 13. The upper marginal portion of the shell 13 is spaced inwardly from the wall of the casing 9 to form an annular communication passage 15. A plurality of discharge perforations 13c are formed in the upper portion of the shell 13 to permit the flow of water outwardly into the communication passage 15 and ultimately therefrom into the discharge outlet 16. A removable cover 17 is provided to facilitate changing or cleaning the filters and, of course, the upper shell 13 may be easily removed from the liner 11 to permit access to the lower filtering element 12.

It will be seen that I have provided a relatively simple yet highly efficient filter for liquids which permits quick and inexpensive replacement of the filtering elements while providing highly effective filtering action. As has been stated, the loop structure which produces tiny filtering filaments is extremely important to the efficiency of my filter elements and in form B of the invention the end to end relation of the two filter elements with the removable upper shell permits the capacity of the filter to be greatly increased while facilitating replacement and cleaning of a multiple element filter unit.

It will, of course, be understood that various changes may be made in the form, arrangement and proportion of the parts without departing from the scope of my invention which consists in the matter set forth in the appended claims.

What I claim is:

1. A filter unit comprising an elongate hollow casing defining a filter chamber therewithin, a plurality of filter elements disposed within said chamber, each of said filtering elements comprising rolled cloth material having absorbent loops formed on both sides, said cloth material being folded into multiple layers and thereafter tightly rolled into helical convolutions to form a filter pack, said casing having an inlet means communicating with an axial portion of one of said filter elements, a removable shell inserted into the casing in snug fitting sealed relation to adjacent portions of the casing disposed above the filter element to provide a separate filtering chamber, communication means provided between said chambers, a second filtering element removably packed into said removable shell, said casing having outlet means communicating with a portion of one of said filter chambers to permit discharge of filtered water therethrough, and a removable cover for said casing to thereby permit removal of the filtering elements for cleaning the same and whereby said filtering elements may thereafter be repacked within said casing.

2. The structure set forth in claim 1 and a second removable shell disposed within said first mentioned removable shell and said second filtering element being removably packed within said second removable shell.

References Cited in the file of this patent

UNITED STATES PATENTS

| | | |
|---|---|---|
| 1,898,027 | Winslow | Feb. 21, 1933 |
| 2,076,980 | Cooper | Apr. 13, 1937 |
| 2,082,322 | Brundage | June 1, 1937 |
| 2,083,546 | Aldham | June 15, 1937 |
| 2,114,485 | Frolander | Apr. 19, 1938 |
| 2,156,329 | Beck | May 2, 1939 |
| 2,530,283 | Brown | Nov. 14, 1950 |
| 2,547,857 | Cook | Apr. 3, 1951 |
| 2,607,495 | Valente | Aug. 19, 1952 |
| 2,792,943 | Macintosh | May 21, 1957 |